United States Patent
Delaney et al.

(10) Patent No.: US 9,703,848 B2
(45) Date of Patent: Jul. 11, 2017

(54) CACHING LINKED QUERIES FOR OPTIMIZED COMPLIANCE MANAGEMENT

(71) Applicant: International Business Machines Corporation, Armonk, NY (US)

(72) Inventors: John V. Delaney, Kildalkey (IE); Anthony M. Hunt, Hopewell Junction, NY (US); Maeve O'Reilly, Rathdrum (IE); Clea A. Zolotow, Key West, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/940,570

(22) Filed: Nov. 13, 2015

(65) Prior Publication Data
US 2017/0140009 A1     May 18, 2017

(51) Int. Cl.
  G06F 17/30     (2006.01)
  G06F 9/54      (2006.01)
(52) U.S. Cl.
  CPC ........ G06F 17/30554 (2013.01); G06F 9/543 (2013.01); G06F 17/30528 (2013.01)
(58) Field of Classification Search
  None
  See application file for complete search history.

(56) References Cited

U.S. PATENT DOCUMENTS

| | | | |
|---|---|---|---|
| 6,240,490 | B1 | 5/2001 | Lyles et al. |
| 2008/0109362 | A1* | 5/2008 | Fransdonk ............ G06Q 30/06 705/51 |
| 2015/0106827 | A1 | 4/2015 | Fiedel et al. |
| 2015/0120711 | A1 | 4/2015 | Liensberger et al. |

FOREIGN PATENT DOCUMENTS

MY    WO 2013147587 A1 * 10/2013 ............. H04L 63/20

OTHER PUBLICATIONS

OSLC, Lifecycle integration inspired by the web, http://www.oasis-oslc.org/, OSLC Community Update Webinar—Jun. 10, 2015, 1 page.

* cited by examiner

*Primary Examiner* — Hosain Alam
*Assistant Examiner* — Tuan-Khanh Phan
(74) *Attorney, Agent, or Firm* — Schmeiser, Olsen & Watts, LLP; Michael A. Petrocelli

(57) ABSTRACT

A method and associated systems for caching linked queries for optimized compliance management. A user requests that a local application perform an operation upon a local dataset. The processor, in response, determines that the operation requires access to remote auxiliary data that is managed by a remote application. The processor reads from a local cache a set of provisional links that identify past sources of the auxiliary information, and displays information associated with those links to the user, clearly identifying the links and associated information as being provisional. If the user requires direct access to the auxiliary information, the system obtains from the remote application updated, verified versions of the links, replaces the provisional links in the cache with the verified links, and displays to the user the verified links and updated versions of the associated information, clearly identifying the links and information as being verified.

20 Claims, 2 Drawing Sheets

CACHING LINKED QUERIES FOR OPTIMIZED COMPLIANCE MANAGEMENT

TECHNICAL FIELD

The present invention relates the improving the efficiency and functioning of computer programs that require automated access to data maintained by other programs running on remote platforms.

BACKGROUND

A business function may require two or more computer systems or applications to operate in a complementary manner. A test engineer may, for example, attempt to document that a product has satisfied all relevant regulatory mandates by using a requirements-management application that stores and organizes the requirements and specifications that must be met by a compliant product.

In order to perform this task, the requirements tool need access to test data that documents procedures and results of product testing that had been performed to confirm the product's compliance. If this test data is maintained by a separate suite of testing tools, the requirements tool cannot complete its operation or fully serve its user until it has established connections to the test data.

In a real-world implementation that may comprise enormous numbers of requirements, regulatory constraints, test cases, and product specifications, this inter-application linkage may become a productivity bottleneck. A user that launches the requirements tool may have to wait an extended period of time before the tool is able to identify and access auxiliary test data from what may be a large number of remote applications, databases, or other types of information repositories.

One solution is to use a synchronization mechanism that copies data from one tool to another, thus allowing, for example, a requirements tool to have direct access to test cases. This approach, however, is resource-intensive, requiring redundant storage of large repositories of data and frequent transfer of that data in order to ensure that the repositories remain synchronized.

BRIEF SUMMARY

A first embodiment of the present invention provides a compliance-management system comprising a processor, a memory coupled to the processor, and a computer-readable hardware storage device coupled to the processor, the storage device containing program code configured to be run by the processor via the memory to implement a method for caching linked queries for optimized compliance management, the method comprising:

the system detecting a user request to access a local dataset by means of a local application;

the system, in response to detecting the user request, retrieving from a local database a provisional link to auxiliary data available through a remote application, wherein the auxiliary data is used by the local application to perform an operation upon the local dataset; and the system displaying the local dataset and the provisional link to the user, such that the provisional link is identified to the user as being provisional.

A second embodiment of the present invention provides a method for caching linked queries for optimized compliance management, the method comprising:

a compliance-management system detecting a user request to access a local dataset by means of a local application;

the system, in response to detecting the user request, retrieving from a local database a provisional link to auxiliary data available through a remote application, wherein the auxiliary data is used by the local application to perform an operation upon the local dataset; and the system displaying the local dataset and the provisional link to the user, such that the provisional link is identified to the user as being provisional.

A third embodiment of the present invention provides a computer program product, comprising a computer-readable hardware storage device having a computer-readable program code stored therein, the program code configured to be executed by a compliance-management system comprising a processor, a memory coupled to the processor, and a computer-readable hardware storage device coupled to the processor, the storage device containing program code configured to be run by the processor via the memory to implement a method for caching linked queries for optimized compliance management, the method comprising:

the compliance-management system detecting a user request to access a local dataset by means of a local application;

the system, in response to detecting the user request, retrieving from a local database a provisional link to auxiliary data available through a remote application, wherein the auxiliary data is used by the local application to perform an operation upon the local dataset; and the system displaying the local dataset and the provisional link to the user, such that the provisional link is identified to the user as being provisional.

DETAILED DESCRIPTION

Figure 1:
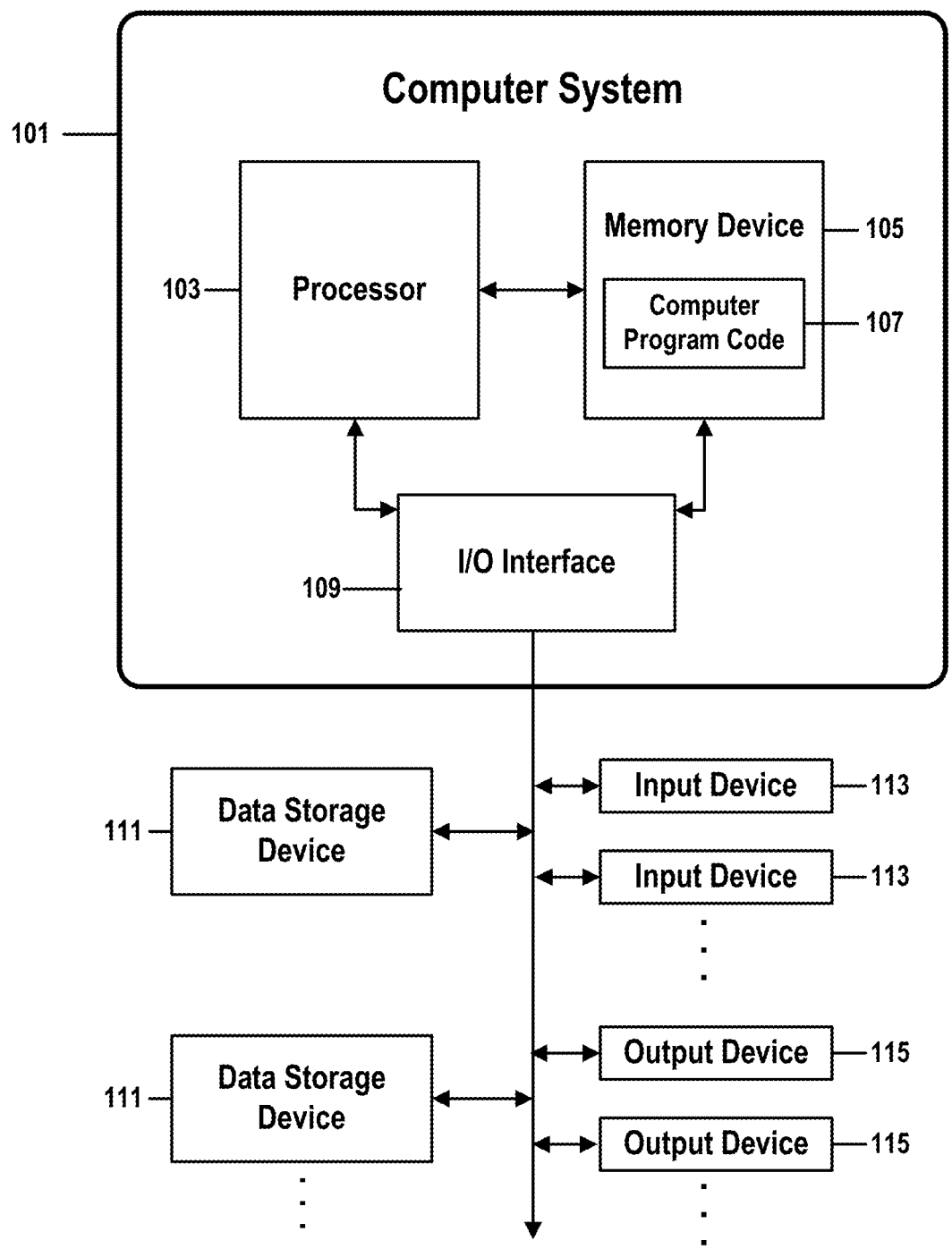
FIG. 1 shows the structure of a computer system and computer program code that may be used to implement a method for caching linked queries for optimized compliance management in accordance with embodiments of the present invention.

Embodiments of the present invention address the inefficiencies and high resource consumption of current methods of synchronizing complementary applications and information repositories.

As described above, simply creating a duplicate copy of each information repository for each complementary application may unnecessarily consume enormous amounts of data storage and network bandwidth.

A more efficient approach is to create and maintain links between applications and the data they share. If, for example, attempting to access a requirements dataset by means of a requirements tool requires accessing test data maintained by five remote applications, the requirements tool might be configured to store hyperlinks to the test data. Similarly, if a user attempting to use a testing tool to analyze test results needs to access requirements documents maintained by a requirements tool, the testing tool might be configured to store hyperlinks to the requirements data.

Even this approach, however, may be resource-intensive in implementations that require many thousands of links to be continuously updated. In cases where complementary applications require bi-directional links, these requirements may be considerably greater.

This class of solutions may be rendered more workable if the synchronization requirements are eased. That is, if links to remote datasets are not continuously updated, it is possible to require updating only on-demand. In such an implementation, a user requests an operation of a local program that requires access to data maintained by a remote program, the local program may automatically update its links to that remote data and then provide the user on-demand access to the required data in the form of Internet browser-compatible hyperlinks.

The problem with this approach is that it may take a significant amount of time for the local application to update a large number of links to many remote, networked sources of data. This delay can cause confusion and seeming indeterminacy in an operation of the local application.

These problems may be illustrated by an example in which two users sign onto a same requirements tool at slightly different times to perform similar functions that require access to identical remote data sets. If the tool requires about thirty minutes to update its links, one at a time, to these remote repositories of data, the links displayed to each user may not be identical while the updating is in progress. It may thus appear to the two users that they are working with different datasets.

Embodiments of the present invention, in addition to teaching such an on-demand link-updating function, further increase the performance of complementary applications and data sources by means of provisional links that are cached in a local database. These provisional links may identify the most-recent verified links to required remote data. In other cases, the provisional links may display general or template data that, although not currently updated, may give the user a general idea of the content that is stored at an updated version of the link.

When a user launches a local application that must link the user to data stored at remote locations, the application thus may quickly read the provisional links from the cache and display them to the user with little delay. By clearly identifying the links as being merely provisional, and by doing so in a graphical style that is compliant with the look-and-feel of the user-interface of the local application, the application may avoid misleading the user into believing that the most current version of the desired datasets are being displayed.

If a user requires access to more specific or more current data than the information that is displayed in relation to the provisional links, embodiments of the present invention may automatically update some or all of the provisional links to current "verified" versions. This may be done by querying each remote application or information repository from which the required data may be accessed.

In some cases, this querying may comprise accessing very large numbers of applications, data repositories, or individual data sets, and such a process may take an extended period of time. During this period of time, the local application may update its display of the provisional links, one at a time, as each is replaced by an updated version that the application has verified is a valid link to the most current information.

In order to avoid confusing the user during this update process, embodiments of the present invention display each verified link in a manner that makes it plain to the user that a corresponding provisional link has been updated. As with the display of the provisional links, the verified links may also be displayed in a graphical style that is compliant with the look-and-feel of the user-interface of the local application.

If the two users of the previous example attempt, by means of an embodiment of the present invention, to launch a local application that requires similar or identical remote datasets, this method will thus make clear to each user which displayed datasets and linkages are live, representing actual current, verified data, and which are provisional placeholders.

Although the embodiments and examples in this document generally describe systems in which a user requests a data set that requires auxiliary data maintained by a remote application at a remote source, these examples should not be construed to limit the scope of the present invention to such implementations. The underlying inventive concept of this invention may be extended to any implementation in which a user requests a local resource on one platform, in which that resource is at least partially dependent upon a second remote resource that resides on a second, distinct platform (or is under the control of an application residing on a second, distinct platform), and in which it is not practical or possible to create and synchronize a local copy of the second resource. In the most general case, a resource may not be limited to stored data. A resource may, for example, comprise a combination of a network or infrastructure component, a virtual asset provisioned on a virtualized cloud-computing platform, or a set of current status or configuration records associated with users, system components, or other resources.

FIG. 1 shows a structure of a computer system and computer program code that may be used to implement a method for caching linked queries for optimized compliance management in accordance with embodiments of the present invention. FIG. 1 refers to objects 101-115.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for caching linked queries for optimized compliance management in accordance with embodiments of the present invention, and may implement other embodiments described in this specification, including the methods illustrated in FIGS. 1-2. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for caching linked queries for optimized compliance management.

Any of the components of the present invention could be created, integrated, hosted, maintained, deployed, managed, serviced, supported, etc. by a service provider who offers to facilitate a method for caching linked queries for optimized compliance management. Thus the present invention discloses a process for deploying or integrating computing infrastructure, comprising integrating computer-readable code into the computer system 101, wherein the code in combination with the computer system 101 is capable of performing a method for caching linked queries for optimized compliance management.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

While it is understood that program code 107 for method for caching linked queries for optimized compliance management may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for method for caching linked queries for optimized compliance management data is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
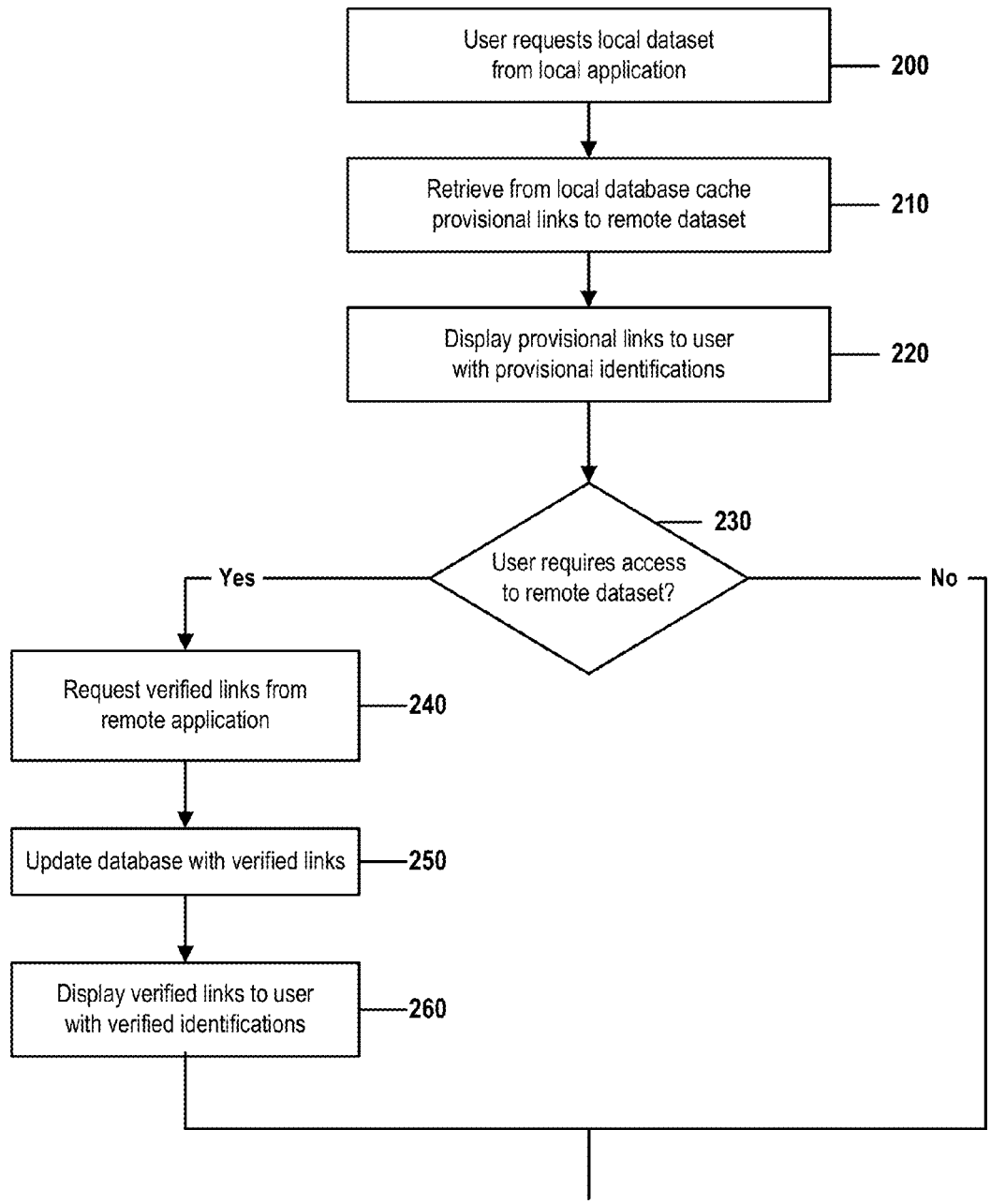
FIG. 2 is a flow chart that illustrates a method for caching linked queries for optimized compliance management in accordance with embodiments of the method of the present invention.

FIG. 2 is a flow chart that illustrates a method for caching linked queries for optimized compliance management in accordance with embodiments of the method of the present invention. FIG. 2 comprises steps 200-260.

In step 200, one or more processors detects that a user has used a local software application to open a local dataset. In one example, a test engineer at an automobile manufacturer may use a test-management software tool to open a dataset of test results associated with ongoing efforts to document a new model's compliance with all relevant government regulatory requirements. In real-world implementations, such a dataset may comprise hundreds of thousands of test results associated with thousands of requirements.

In step 210, the one or more processors respond to the detection of step 200 by retrieving from a local database, or other type of information repository, one or more provisional links to one or more components of a remote dataset. Such a remote dataset may comprise information required in order for the local application to fully or correctly represent the requested local dataset.

In the previous example, a remote dataset might comprise a body of the most-recently updated government regulations associated with the local dataset of test results. In order for the test-management tool to allow a user to determine if a test result indicates compliance with a specific regulation, the tool must have access to the most current versions of the regulations themselves. Hence, when a user requests a local dataset of test results related to a particular product's compliance with a certain set of regulatory requirements, the test-management tool must request a remote dataset of the latest versions of those requirements from a remote requirements-management application.

The provisional links may be stored in a special cache area of the database or repository. This cache may be reserved for such links, it may be used to organize the links into a distinct logical or functional component of the database or repository, or it may be implemented so as to provide faster access to the links.

One or more of the provisional links may be deemed to be provisional because it has not been verified or confirmed to be an active, live link to current location of a component of the remote dataset. In some cases, a provisional link may be a most recently verified version of the link. Such a link may, however, no longer be valid if, for example, pointing to an older test result of a continuously updated dataset of test results.

In other cases, a provisional link may be a generic link that allows an application to display a general description or characterization of information likely to be at a verified, live version of the provisional link. Such a provisional link may, for example, display a general description or characterization of a set of regulatory requirements, but would not display actual, current versions of those requirements.

In step 220, the one or more processors display the provisional links to the user. These links may be displayed in a manner that identifies them as being provisional. This manner of display may conform to a user interface, a general look-and-feel style, or an other interface convention of the local application. Because these links may be retrieved from a cache or other type of higher-speed storage medium, they may be displayed very quickly. In an ideal embodiment, representations of the provisional links and data associated with those links might be displayed instantly in response to a user's request for a local dataset.

The manner of display may, for example, display a provisional link in a distinctive color scheme, border, or font, or it may display an identifying message when a cursor is passed over the displayed link.

A provisional link may be displayed as a hyperlink, as a logical name or other identifier of a hyperlink, or as a block of text or other information that describes, characterizes, or gives an example of information or other resource identified by the link.

If, for example, a provisional link points to a "synchronization-operation" performance requirement, the local application might in step 220 display a block of text that identifies this requirement, lists citations to regulations associated with the requirement, and displays a one-sentence pop-up description of the requirement when a user passes a mouse over the block of text. In other cases, the block of text may comprise a display of a past, or most recently accessed, version of the actual performance requirement. In such embodiments, a user may be allowed to selectively display or hide that past version of the requirement by clicking a clearly identified area of the displayed block of text.

In all of these examples, the displayed provisional information would be represented by means of a distinctive color, font, icon, cell or text-block format, animation, sound, or other visual or audible mechanism that makes it clear to the user that this performance requirement is represented provisionally.

In some embodiments, a user may be allowed to click an area of this representation to submit an on-demand request that the provisional link be updated so as to allow the user access to an updated version of the performance-requirement culled from an updated version of the provisional link that has been verified to be working and live.

In step 230, the one or more processors determine whether the user requires actual access to a most current version of the remote dataset. In some cases, a user may need only to see canned or provisional information represented by representations of the provisional links displayed in step 220. A user might, for example, need desire to identify only a general class of requirements associated with a local dataset of test results. In such a case, there would be no need for a user to wait for the processors to update and verify the provisional links in order to provide access to actual, live sources of requirement details.

In some embodiments, the user may manually instruct the local application to verify all displayed provisional links, may manually instruct the application to verify only those links that satisfy certain criteria or that meet certain conditions, or may manually select provisional links to verify. In other embodiments, a system may automatically verify some or all provisional links or may automatically verify some or all provisional links when it determines that some condition related to a project, a characteristic of a user, a security setting, an application, a dataset, or some other associated entity, has been satisfied.

If the processors in step 230 determine that a user should be provided access to the remote dataset, then the method of FIG. 2 continues with steps 240-260. If not, then the method of FIG. 2 ends.

In step 240, the processors initiate a background procedure that updates one or more of the provisional links to a corresponding verified link. Here, the processors verify that each verified link points to a data source or other resource that is currently live. In some embodiments, the processors may further verify that the live data source or resource is a recent or most-recent version of the data source or resource that was conditionally identified by the corresponding provisional link.

In some embodiments, the processors verify a link by requesting that a remote application provide a verified link that corresponds to a provisional link. Such a remote application may manage or maintain a remote dataset or other resource that comprises a data element, dataset, or other resource identified by a provisional link and by a verified link that corresponds to the provisional link.

In some embodiments, the remote application may have access to a remote dataset that comprises information identified by a provisional or verified links, but may have no knowledge of a format or content of the provisional or verified links themselves. In such cases, the one or more processors may translate a provisional link into a query for data associated with the provisional link, submit the query to the remote application, and then manually construct a corresponding verified link as a function of data or data sources returned by the remote application in response to the query.

Embodiments may employ other methods known in the art in order to generate a verified link as a function of a characteristic of a corresponding provisional link and of live, updated information provided by a remote application in response to a query.

In step 250, the processors update or replace the provisional links stored in the cache, local database, or other local information repository with the corresponding verified versions of those links received or generated in step 240.

In some embodiments, this updating may be performed efficiently by simply storing each verified link as a URI (Uniform Resource Identifier), such as an Internet URL (Uniform Resource Locator) or URN (Uniform Resource Name), or as an other type of identifier, rather than as data itself.

Storing the verified links in the cache in step 250 may automatically update the provisional links already stored in the cache. In this way, the the next time that a user requests a local dataset that requires a remote dataset identified by cached links, those cached provisional links will have been updated to be at least as current as the links just verified in step 240.

In some embodiments, a method of storing links as cached URI's, rather than storing the actual datasets identified by the links, may facilitate advanced security operations. If all or part of a dataset should not be visible to a user who is employed by a certain business, who has an insufficient level of security clearance, or who is associated with a certain geographical operation, this implementation allows a local application full control over a level of detail of information associated with each link that may be displayed to each user. The application may employ whatever criteria is appropriate to determine whether a particular user may see information associated with a particular provisional link, whether the user may see corresponding information associated with a corresponding verified link, or whether that user may link to a data source or other resource that the verified link points to. In some embodiments, such implementations may provide further security by decoupling contents of an actual data source from the local application, allowing remote applications (to which a user might have no direct access) to use their own intrinsic security procedures to secure the datasets and resources that they manage.

In step 260, the one or more processors replace displayed information associated with each provisional link, displayed in step 220, with analogous information associated with a corresponding verified link identified in step 240.

These verified links and their associated information may be displayed in a manner that identifies them as being verified, much in the same way that the provisional links their associated information was displayed in step 220 in a manner that identified them as being provisional.

As in step 220, this manner of display may conform to a style of a user interface, a general look-and-feel, or an other interface convention of the local application. Because the verified links may be not be retrieved at the same time, or may require a significant amount of item to identify and display, the verified links may appear one at a time, in groups, or in a sequence determined by technical or other implementation-dependent constraints.

In all cases, the local application should display the provisional and verified links, and information associated with each displayed link, in ways that allow a user to clearly determine which links are provisional and which have been verified. This may be done by displaying distinctive icons, fonts, colors, borders, animations, pop-up menus or text blocks, sounds, text-block formats, or any other audio-visual mechanism that makes allows a user to distinguish between provisional and verified, updated datasets or links.

In some embodiments, the user may then manually click through the displayed representation of a verified link in order to directly access an information source or other resource that the link points to. As described above, the user's ability to so access such an information source or resource may be determined by the local application using any criteria that may be programmed into the local application by means known in the art.

What is claimed is:

1. A compliance-management system comprising a processor, a memory coupled to the processor, and a computer-readable hardware storage device coupled to the processor, the storage device containing program code configured to be run by the processor via the memory to implement a method for caching linked queries for optimized compliance management, the method comprising:

the system detecting a user request to access a local dataset by means of a local application;

the system, in response to detecting the user request, retrieving from a local database a provisional link to auxiliary data available through a remote application, wherein the auxiliary data is used by the local application to perform an operation upon the local dataset, wherein retrieving auxiliary data through the remote application requires a substantially longer network-transfer time than does retrieving corresponding information from the local database, wherein the provisional link is a temporary link to requested data stored in the local database that serves as a user-visible placeholder until the user receives from the remote application a corresponding verified link to a component of the requested dataset maintained by the remote application, wherein the receipt of the corresponding verified link indicates to the local application that the corresponding verified link is an active, live link to a current location of a component of the local dataset that replaces a location that had previously been identified by the provisional link, and wherein the verification and receipt of the corresponding verified link are not contingent upon a state of a security setting; and the system displaying the local dataset and the provisional link to the user, such that the provisional link is identified to the user as being provisional.

2. The system of claim 1,
wherein the provisional link is displayed in a manner that allows the user to determine that the corresponding verified link exists, but does not display all data referenced by the verified link.

3. The system of claim 2, further comprising:
the system verifying the provisional link by requesting the verified link from the remote application, wherein the verified link is an updated version of the provisional link;
the system receiving from the remote application, in response to the requesting, the requested verified link;
the system replacing the provisional link stored in the local database with the received verified link; and
the system updating the user's display by displaying the verified link in place of the provisional link in a manner that identifies to the user that the verified link has been verified.

4. The system of claim 3, wherein the verifying, receiving, replacing, and updating are performed only if the user requires access to data identified by the verified link.

5. The system of claim 3,
wherein the remote application comprises two or more remote applications,
wherein the provisional link comprises two or more provisional links,
wherein the requested verified link comprises two or more verified links,
wherein a first provisional link of the two or more provisional links and a first verified link of the two or more verified links both identify a same first data element of the auxiliary data, and
wherein access to each data element of auxiliary data is controlled by at least one application of the two or more remote applications.

6. The system of claim 3,
wherein the processor identifies to the user that the displayed provisional link is provisional by displaying the provisional link in a manner that conforms to a user interface of the local application, and
wherein the processor identifies to the user that the displayed verified link has been verified by displaying the verified link in a manner that conforms to a user interface of the local application.

7. The system of claim 3, wherein the overwriting comprises storing in the database only a URI associated with the verified link.

8. The system of claim 3, wherein the provisional link and the verified link are stored in a component of the local database that functions as a cache.

9. A method for caching linked queries for optimized compliance management, the method comprising:
the system detecting a user request to access a local dataset by means of a local application;
the system, in response to detecting the user request, retrieving from a local database a provisional link to auxiliary data available through a remote application, wherein the auxiliary data is used by the local application to perform an operation upon the local dataset, wherein retrieving auxiliary data through the remote application requires a substantially longer network-transfer time than does retrieving corresponding information from the local database, wherein the provisional link is a temporary link to requested data stored in the local database that serves as a user-visible placeholder until the user receives from the remote application a corresponding verified link to a component of the requested dataset maintained by the remote application, wherein the receipt of the corresponding verified link indicates to the local application that the corresponding verified link is an active, live link to a current location of a component of the local dataset that replaces a location that had previously been identified by the provisional link, and wherein the verification and receipt of the corresponding verified link are not contingent upon a state of a security setting; and
the system displaying the local dataset and the provisional link to the user, such that the provisional link is identified to the user as being provisional.

10. The method of claim 9,
wherein the provisional link is displayed in a manner that allows the user to determine that the corresponding verified link exists, but does not display all data referenced by the verified link.

11. The method of claim 10, further comprising:
the system verifying the provisional link by requesting the verified link from the remote application, wherein the verified link is an updated version of the provisional link;
the system receiving from the remote application, in response to the requesting, the requested verified link;
the system replacing the provisional link stored in the local database with the received verified link; and
the system updating the user's display by displaying the verified link in place of the provisional link in a manner that identifies to the user that the verified link has been verified.

12. The method of claim 11, wherein the verifying, receiving, replacing, and updating are performed only if the user requires access to data identified by the verified link.

13. The method of claim 11,
wherein the processor identifies to the user that the displayed provisional link is provisional by displaying the provisional link in a manner that conforms to a user interface of the local application, and
wherein the processor identifies to the user that the displayed verified link has been verified by displaying the verified link in a manner that conforms to a user interface of the local application.

14. The method of claim 11, wherein the overwriting comprises storing in the database only a URI associated with the verified link.

15. The method of claim 9, further comprising providing at least one support service for at least one of creating, integrating, hosting, maintaining, and deploying computer-readable program code in the computer system, wherein the computer-readable program code in combination with the computer system is configured to implement the detecting, retrieving, and displaying.

16. A computer program product, comprising a computer-readable hardware storage device having a computer-readable program code stored therein, the program code configured to be executed by a compliance-management system comprising a processor, a memory coupled to the processor, and a computer-readable hardware storage device coupled to the processor, the storage device containing program code configured to be run by the processor via the memory to implement a method for caching linked queries for optimized compliance management, the method comprising:
the system detecting a user request to access a local dataset by means of a local application;
the system, in response to detecting the user request, retrieving from a local database a provisional link to auxiliary data available through a remote application, wherein the auxiliary data is used by the local application to perform an operation upon the local dataset, wherein retrieving auxiliary data through the remote application requires a substantially longer network-transfer time than does retrieving corresponding information from the local database, wherein the provisional link is a temporary link to requested data stored in the local database that serves as a user-visible placeholder until the user receives from the remote application a corresponding verified link to a component of the requested dataset maintained by the remote application, wherein the receipt of the corresponding verified link indicates to the local application that the corresponding verified link is an active, live link to a current location of a component of the local dataset that replaces a location that had previously been identified by the provisional link, and wherein the verification and receipt of the corresponding verified link are not contingent upon a state of a security setting; and the system displaying the local dataset and the provisional link to the user, such that the provisional link is identified to the user as being provisional.

17. The computer program product of claim 16, wherein the provisional link is displayed in a manner that allows the user to determine that wherein the provisional link is displayed in a manner that allows the user to determine that the corresponding verified link exists, but does not display all data referenced by the verified link, corresponding verified link exists, but does not display all data referenced by the verified link.

18. The computer program product of claim 17, further comprising:

the system verifying the provisional link by requesting the verified link from the remote application, wherein the verified link is an updated version of the provisional link;

the system receiving from the remote application, in response to the requesting, the requested verified link;

the system replacing the provisional link stored in the local database with the received verified link; and the system updating the user's display by displaying the verified link in place of the provisional link in a manner that identifies to the user that the verified link has been verified.

19. The computer program product of claim 17, wherein the verifying, receiving, replacing, and updating are performed only if the user requires access to data identified by the verified link.

20. The computer program product of claim 17, wherein the overwriting comprises storing in the database only a URI associated with the verified link.

* * * * *